S. Loveland.
Floating Dock.
No. 115.
Reissued May 23, 1848.
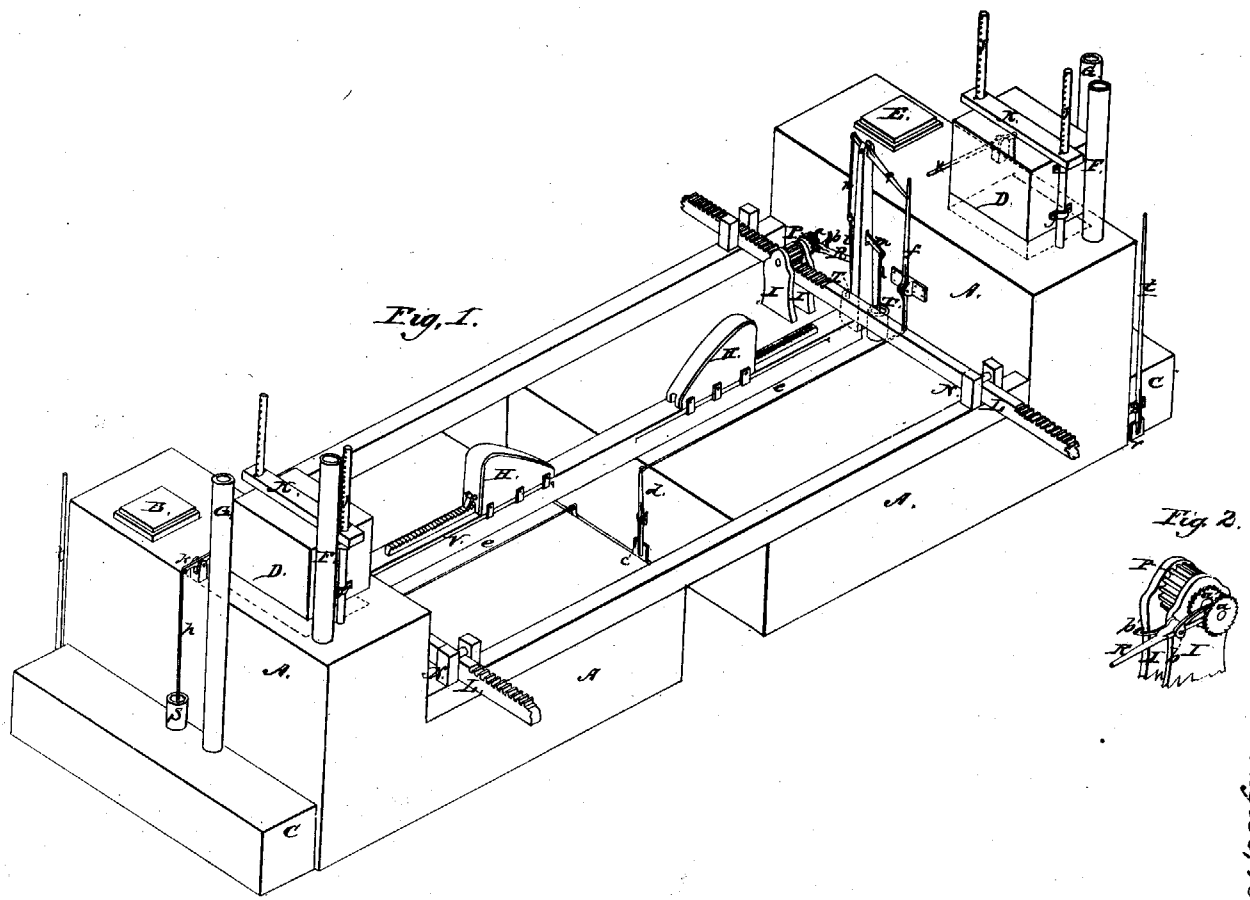
N. PETERS, PHOTO-LITHOGRAPHER, WASHINGTON, D.C.

UNITED STATES PATENT OFFICE.

SAMUEL LOVELAND, OF OSWEGO, NEW YORK.

IMPROVEMENT IN FLOATING DRY-DOCKS.

Specification forming part of Letters Patent No. 4,954, dated February 5, 1847; Reissue No. 115, dated May 23, 1848.

*To all whom it may concern:*

Be it known that I, SAMUEL LOVELAND, of Oswego, in the county of Oswego and State of New York, have invented a new and improved floating sectional dock for raising vessels out of the water when repairs are required, for buoying vessels over bars or shoals, or other purposes; and I do hereby declare the following to be a full, clear, and exact description of the construction and operation thereof, reference being had to the accompanying drawings, making a part of this specification, in which—

Figure 1 is a perspective view of a section of the dock, and Fig. 2 an enlarged view of a portion of the same detached.

The section consists, essentially, of two large buoyant chambers, A A, of two balancing-chambers, C C, and of the two air-tight suspension-chambers, D D. The two buoyant chambers A A are connected to each other by beams and braces in a strong and suitable manner.

Upon the central connecting-beam, V, are placed the bilge-blocks H H, secured by guides and having a sliding motion for the purpose of adjusting them to the hull of a vessel resting upon a suitable number of the sections. The bilge-blocks are secured in any desired position by pawls taking into a ratchet on the beam V. Each buoyant chamber A has an offset at its outer end, the rise of which is equal to the depth of the buoyant chamber, and its width about one-fourth the length of the same.

E E are hatches on the offsets of the buoyant chambers, for the admission of persons into the chambers when repairs are required. The hatches are closed and calked water-tight when the buoyant chambers are in use.

F F are vertical air-pipes rising from the tops of the offsets for the purpose of supplying air to the buoyant chambers when they are immersed below the surface of the water.

*c c* are valves closing apertures in the inner ends of the buoyant chambers, through which water is admitted when it is desired to sink them. The valves *c c* are operated by a person standing on the offsets of the buoyant chambers by means of the levers *f*, the connecting-rods *e*, and the levers *d*. The lower side of the apertures in the inner ends of the buoyant chambers, closed by the valves *c c*, are even with the bottoms of the buoyant chambers. The water is pumped out of the buoyant chambers by means of pumps so arranged that they can be operated under water by persons standing on the offsets or on the suspension-chambers D D.

T T are pump-barrels, inserted into one of the buoyant chambers near its offset. The piston-rods *l l* are attached to the ends of the lever *m*, and the rod *n* connects this with the working-lever *p*. The other buoyant chamber of the section has pumps arranged in the same manner. (Not shown in the drawings.)

The balancing-chambers C C are permanently secured to the outer ends of the large buoyant chambers A, their bottoms being on a line with each other. At one end of the balancing-chambers are apertures for the admission of water, closed by the valves *r*, which are operated by the levers *t t*.

S is a pump-barrel, (inserted into one of the balancing-chambers.)

*h* is the piston-rod, and *k* is the working-lever of the pump for emptying the chamber of water. The other balancing-chamber has a pump connected thereto, arranged in the same manner, worked by the lever *k*.

G G are air-pipes inserted into the balancing-chambers, (rising to the same height of the air-pipes F F,) for the purpose of admitting air to them when they are exhausted of water.

The balancing-chambers C C are for the purpose of preserving the equilibrium of the buoyant chambers A A while raising them out of the water. Should one of the buoyant chambers rise faster than the other, a small quantity of water discharged from the balancing-chamber attached to the opposite buoyant chamber of the section will restore its equilibrium. The balancing-chambers C C are also used for raising the buoyant chambers A A out of the water when repairs are required. This is done by opening the valves *c c* and exhausting the water from the balancing-chambers, the buoyancy of the balancing-chambers elevating the buoyant chambers and discharging the water in them through the apertures of the valves *c c*.

The air-chambers D D are for the purpose of floating the sections when they are immersed in the water. They slide up and down between the guiding-posts J J, to which they are connected by the loops *g g*. The posts J J pass through apertures in the ends of the cross-pieces K K, resting on the air-chambers. The position of the air-chamber is regulated and adjusted by pins inserted in apertures in the grinding-posts above the cross-pieces K K. A gallows-frame or any other suitable mechanical equivalent may be made use of for connecting the suspension air-chambers D D with the buoyant chambers in place of the guiding-posts J J.

The requisite number of sections to raise a vessel out of the water are connected to each other by the beams L L. The connecting-beams L pass through "bits" N N, (constructed in the usual manner,) attached to the side connecting-beams of the buoyant chambers. The connecting-beams L L have racks secured at suitable intervals to their upper sides.

I I are supports of the pinions P, working into the racks on the upper side of the beams L.

R is a lever, to which is attached two clicks, *b b'*, for operating the pinion P, the click *b* catching into the teeth of the ratchet-wheel *a'* (on the axle of the pinion P) when motion is imparted to the pinion in one direction, and the click *b'* into the teeth in the ratchet-wheel *a* when the pinion is turned by the lever in an opposite direction. These pinions, racks, and levers serve to draw together the respective sections of the dock as circumstances may require.

The different valves and the pump-levers can be operated by persons standing upon the offsets or elevated outer ends of the buoyant chambers A A.

When a vessel is to be raised in or out of the water, a suitable number of the sections are secured to each other by the beams L L, and the air-chambers D D are securedin proper positions. The valves are then opened and the buoyant and balancing chambers are flooded and immersed in the water until they are suspended by the air-chambers D D. The vessel is then floated onto the sections between the air-chambers D D, or the sections are passed under the hull of the vessel. The valves *r r* are then closed and the water is pumped from the balancing-chambers C C. The buoyancy thus imparted to them is sufficient to elevate the buoyant chambers A A till their connecting-beams begin to bear against the keel of the vessel. The valves *c c* are then closed and the water is pumped from the buoyant chambers until the vessel and the decks of the sections are elevated entirely above the surface of the water when repairs are required, or until the vessel has been sufficiently elevated to allow her to pass over shoals or bars when the sections are used for this purpose.

It will readily be perceived that much labor is saved by first pumping the water out of the balancing-chambers C C and causing them to buoy up the large chambers A A, and thereby discharging a large quantity of water from these chambers that would otherwise have to be pumped out.

The following are believed to be some of the advantages possessed by my improved "floating sectional dock" over others now before the public: first, simplicity and economy of construction; second, greater durability from the peculiar and compact form of the large buoyant chambers and the combination therewith of the air-chambers D D, by means of which the entire section, when not in use, can be immersed in the water and be suspended by the air-chambers; third, facility and ease of preserving the equilibrium of the sections by means of the combination of the balancing-chambers C C with the large buoyant chambers A A; fourth, in the saving of labor in raising the "sections" out of the water by the aid of the balancing-chambers.

Having thus fully described my improved floating sectional dock, what I claim therein as new, and desire to secure by Letters Patent, is—

The combination of the air-tight suspension-chambers D D with the large buoyant chambers A A by any suitable mechanical contrivance, for the purpose of graduating the depth of immersion of the buoyant chambers when filled with water to suit the draft of vessels, and also for the purpose of suspending the buoyant chambers, when not in use, submerged entirely below the surface of the water, for protecting them from decay, not intending by this claim to limit myself to the exact form, number, and arrangement of parts as herein described and represented, but to vary them as I may deem expedient, while I attain the same end by means substantially the same.

SAMUEL LOVELAND.

Witnesses:
J. ENSLOW,
WILLIAM STEWART.